July 16, 1957     I. R. WISNER ET AL     2,799,209

FOURDRINIER PAPERMAKING MACHINE

Filed March 28, 1952                             13 Sheets-Sheet 1

INVENTORS
ISLE R. WISNER
WESLEY S. CORBIN
HENRIK WALDEN
BY D. Emmett Thompson
Attorney INVENTORS
ISLE R. WISNER
WESLEY S. CORBIN
HENRIK WALDEN
BY
D. Emmett Thompson
Attorney July 16, 1957   I. R. WISNER ET AL   2,799,209
FOURDRINIER PAPERMAKING MACHINE
Filed March 28, 1952   13 Sheets-Sheet 6

INVENTORS
ISLE R. WISNER
WESLEY S. CORBIN
HENRIK WALDEN
BY D. Emmett Thompson
Attorney

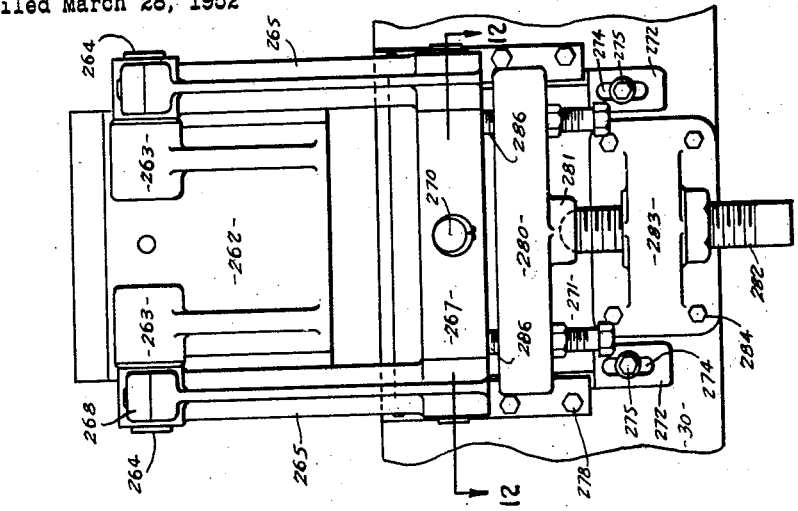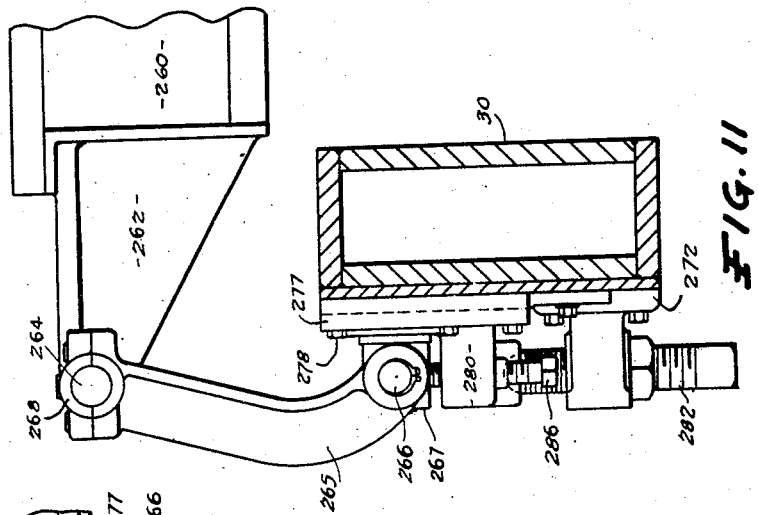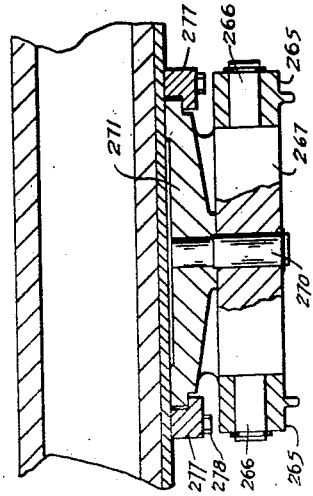

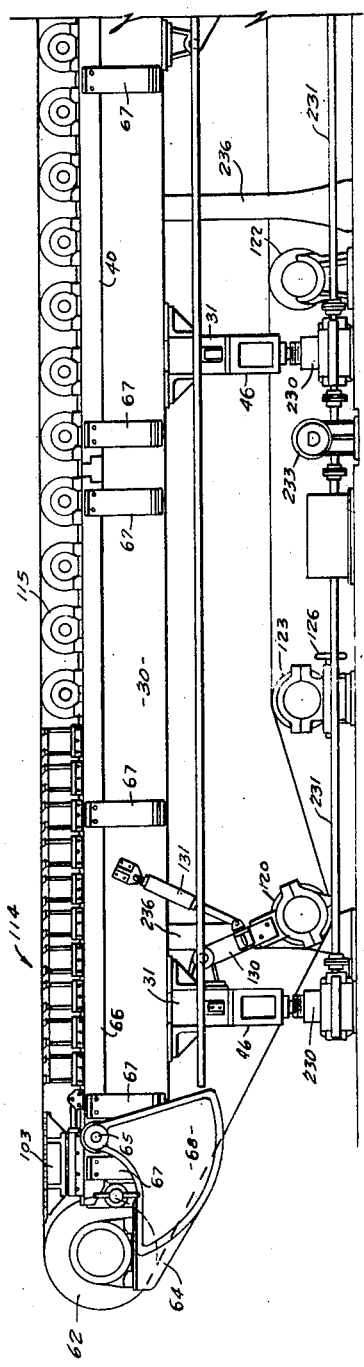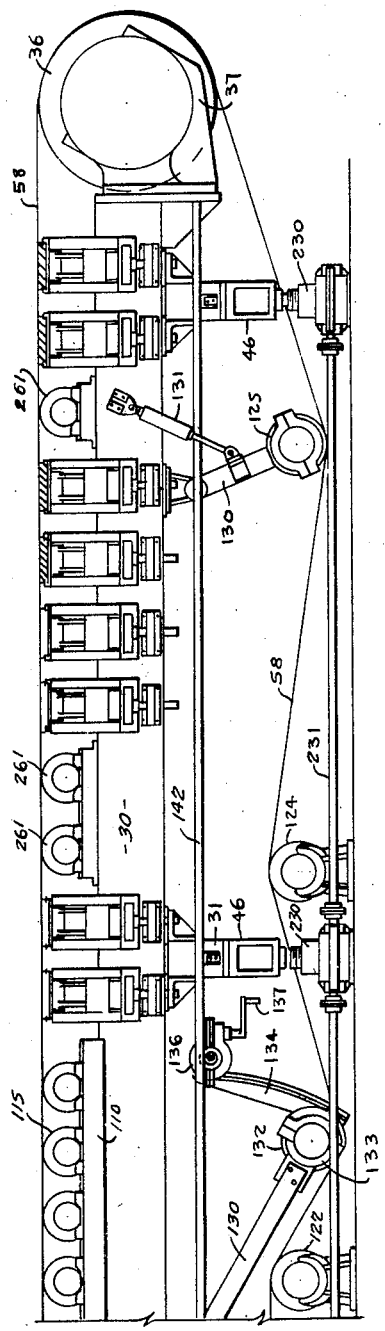

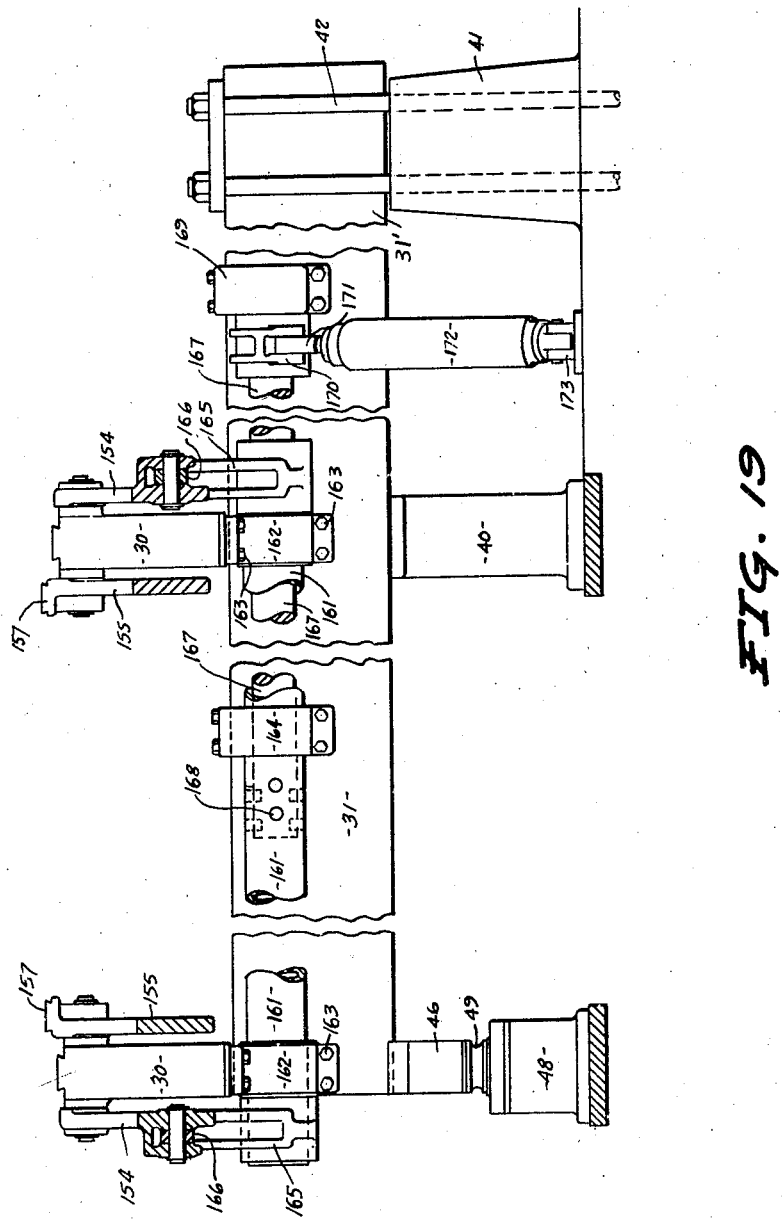

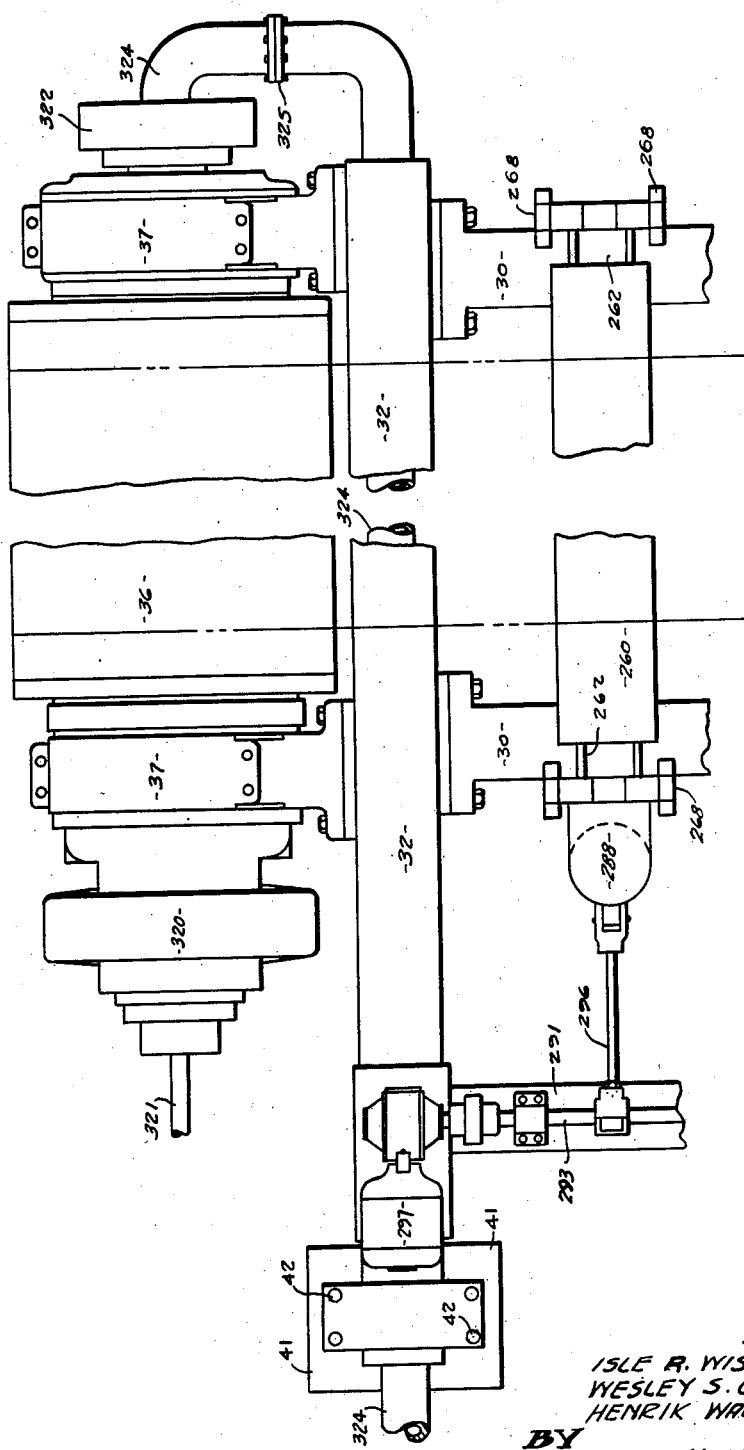

United States Patent Office 2,799,209
Patented July 16, 1957

2,799,209
FOURDRINIER PAPERMAKING MACHINE

Isle R. Wisner, Wesley S. Corbin, and Henrik Walden, Watertown, N. Y., assignors, by mesne assignments, to The Black-Clawson Company, Hamilton, Ohio, a corporation of Ohio Application March 28, 1952, Serial No. 279,052

7 Claims. (Cl. 92—44)

This invention relates to Fourdrinier paper making machines. In recent years, these machines have increased materially in size and are currently manufactured with wires in the neighborhood of 300 inches in width, the machine weighing several tons. Heretofore in changing a wire, it has been necessary to tilt, or cantilever, the entire machine, or to shift the entire machine laterally from its normal operating position in order to remove the old wire and insert a new one. These methods not only require extensive structural arrangements, but also necessitated disconnecting several parts of the machine, all whereby the time necessarily consumed in removing a wire and inserting a new wire amounted to several hours. With the larger machines producing a correspondingly larger production, this extensive down time in changing the wire has become very costly to paper mills.

This invention has as a general object a Fourdrinier paper making machine embodying a construction for very large machines and which, because of novel structural arrangements, permits the changing of a wire in a much shorter time than has been possible with machines heretofore.

The invention has as a further object a Fourdrinier paper making machine embodying a structural arrangement by which the machine is fixedly mounted and which permits the changing of the wire without disturbing the mounting or alinement of the machine.

The invention has as a further object a supporting structure for suction boxes on Fourdrinier machines which permits the boxes to be quickly and conveniently removed and replaced.

The invention has as a further object a double suction box or roll construction wherein the connections to the suction boxes do not have to be broken or disturbed during the changing of the wire.

The invention consists in the novel features and in the combinations and constructions hereinafter set forth and claimed.

In describing this invention, reference is had to the accompanying drawings in which like characters designate corresponding parts in all the views.

In the drawings:

Figure 10 is a side elevational view of one of the suction box supporting structures, the view being indicated by line 10—10, Figure 9.

Figure 11 is a side elevational view of the structure shown in Figure 10.

Figure 12 is a sectional view taken on line 12—12, Figure 10.

Figures 15 and 16 are side elevational views, similar to Figures 1 and 2, showing a machine embodying a modified structure.

Figure 19 is a view taken on a line corresponding to line 19—19, Figure 17.

Figure 21 is a top plan view of the couch roll and contiguous end portion of the machine frame illustrating the couch roll provided with two suction boxes.

Figure 9:
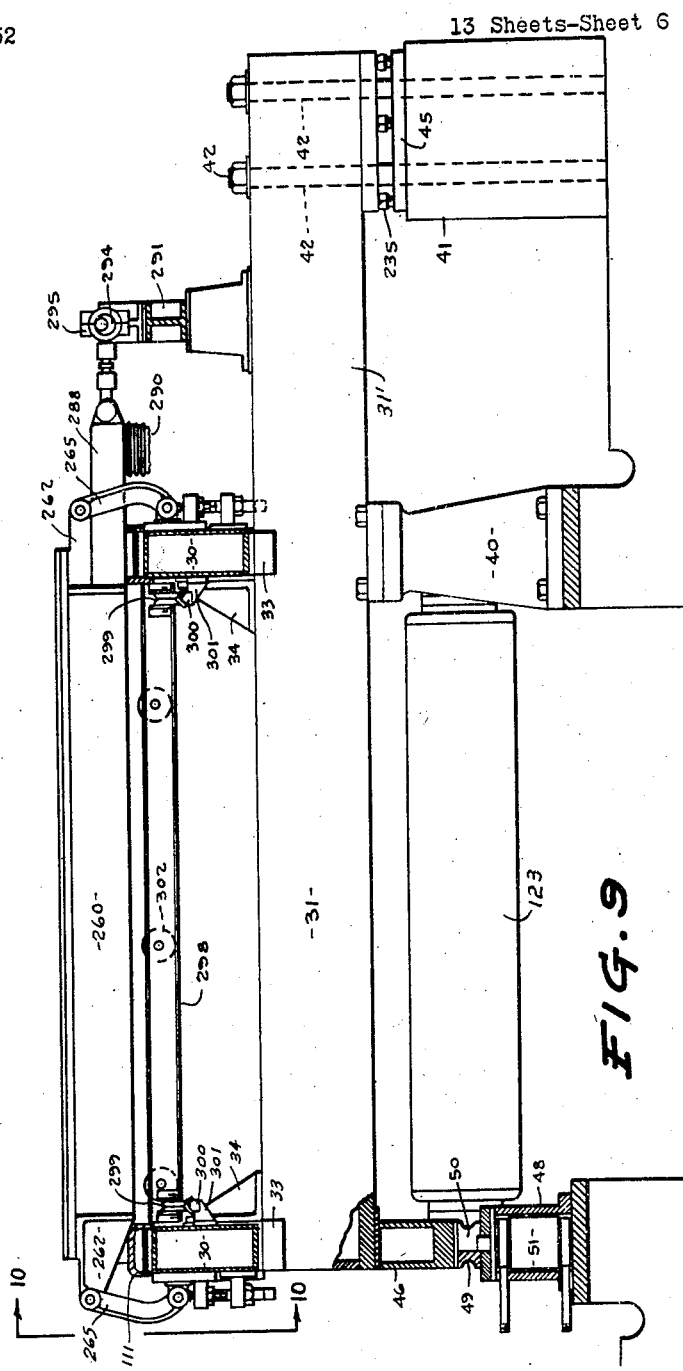
Figure 9 is a view taken on line 9—9, Figure 2.

Referring particularly to Figures 1 to 9, the machine consists of a pair of front and rear side beams 30 formed of steel plates welded together to form a box structure in cross section, see Figure 9. These side beams extend the entire length of the machine and are supported by a series of cross beams 31 and a cross beam 32 at the couch roll end of the beams 30. The cross beams 31 are positioned below the side beams 30 and are fixedly secured thereto by angle plates 33, 34 to form therewith a unitary frame. The beams 30 are formed at their ends with a portion 35 of greater width in the vertical direction, and the cross beam 32 is affixed to these enlarged portions 35 and is of substantially greater width in the vertical direction extending upwardly to the top edge of the side beams 30. A suction couch roll 36 is journalled in bearing structures 37 mounted directly on the cross beam 32.

The cross beams 31, 32, extend laterally from the rear side of the machine, these beams being supported on columns 40 positioned directly below the rear side beam 30, see Figures 9 and 19, to form the base supports for the unitary machine frame. Each of the cross beams 31 and 32 includes an elongated extension 31', 32' at the back side of the machine, and these extensions are secured at their outer ends to additional base supports 41, as by bolts 42. The ends of the beams 31, 32 at the front side of the machine are supported by removable spacer blocks 46 provided on opposite sides with handles 47, these blocks being positioned on housings 48, or preferably on spacer blocks 49 of relatively small dimension and light weight compared with the blocks 46. The blocks 49 are formed with slots 50, and the arrangement of the cross beams and their extension portions as described in connection with Fig. 9 is such that the cross beams are permanently cantilevered to support the front side beam 30 in substantially the same horizontal plane with the rear side beam 30 even after the blocks 49 have been removed.

Figure 13:
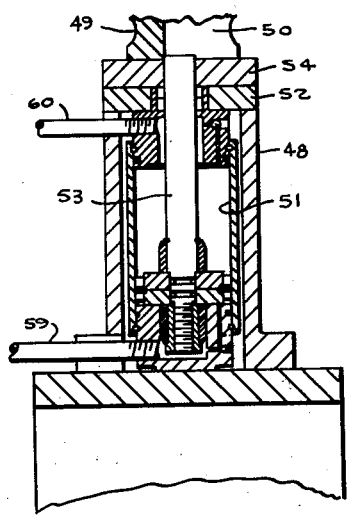
Figure 13 is an enlarged vertical sectional view of one of the hydraulic jacks and housing in which the same is mounted.

An elevating jack is mounted in each of the housings 48. As shown in Figures 9 and 13, each of these jacks consists of a hydraulic cylinder 51 provided at its upper end with a head having a circular flange 52 (Figure 13) overlying the top edge of the housing 48. The piston rod 53 extends upwardly through an aperture in a circular plate 54 positioned on top of the flange 52.

This arrangement is provided to permit removal of the spacer blocks 46 for the insertion of a new wire 58. When it becomes necessary to replace the wire, fluid pressure is admitted to the lower end of the cylinders 51 through pipes 59, causing the piston rods 53 to move upwardly through the slots 50 in the blocks 49 and engage the under side of the blocks 46, the hydraulic cylinder and piston structures applying an upward pressure on the blocks 46 to relieve the downward pressure on the blocks 49 and to permit the same to be conveniently removed. The fluid pressure is then released from the lower end of the cylinders 51 and applied to the upper ends thereof through the pipes 60 to move the piston rods 53 downwardly, whereupon the larger spacer blocks 46 may be removed. This provides a space from the plates 54 to the under side of the beams 31, 32, for the insertion of the new wire, the machine being at the time supported entirely by the cross beams 31.

The breast roll 62 is journalled at its ends in bearings 63, these bearings being mounted upon arms 64 which are pivotally mounted, as at 65, to shake rails 66 supported by flat spring members 67 carried by the side beams 30. The supporting arms 64 are formed at their outer sides with arcuate flanges 68 grooved on their peripheral edges to receive a cable 69, one end of which is secured to the flange portion 68, the cables being trained about sheaves 70, and the opposite ends of the cables being secured to the sheaves, as at 71, see Figures 1 and 8. The sheaves 70 are fixedly secured to shafts 72 journalled in the lower portion of columns 75, the shafts 72 being connected together by a shaft 76, see Figure 8, whereby the sheaves rotate in unison. A smaller sheave 78 is fixedly secured to the outer ends of the shafts 72 to receive cables 79, the upper ends of which are secured to piston rods 80 by means of clevices 81. The piston rods are movable in cylinders 82 which are supported by yoke members 83 pivoted at 84 to the upper ends of the housing 75. The yokes 83 are provided with adjusting screws 86 for properly positioning the cylinders 82.

Figure 1:
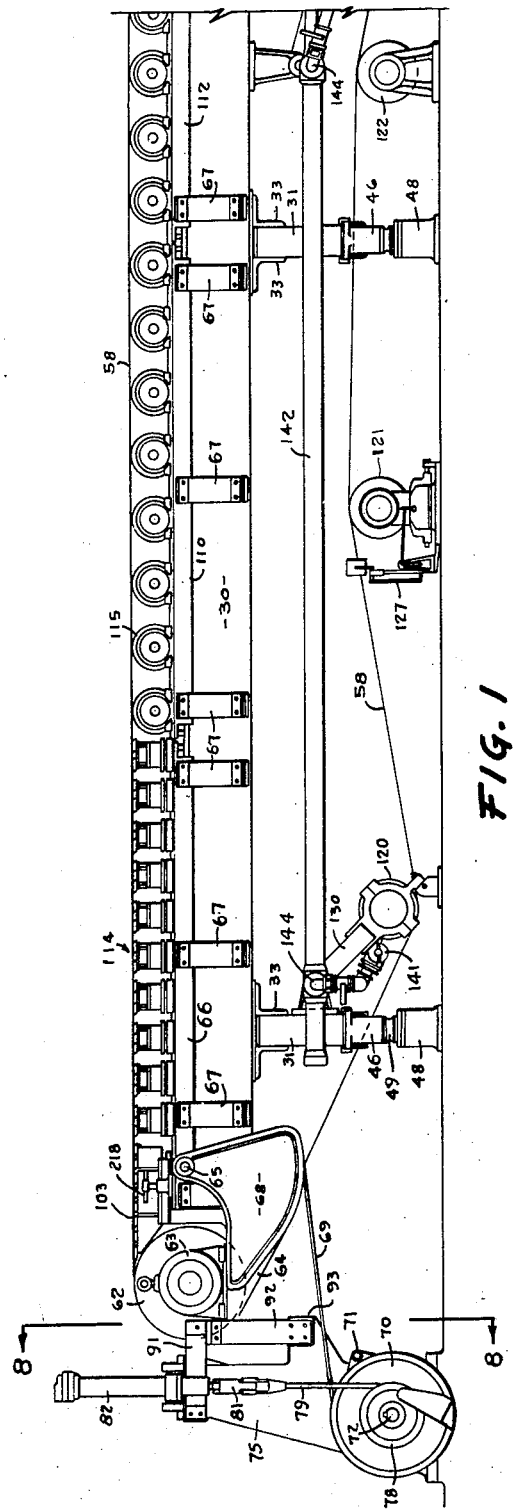
Figure 1 is a side elevational view of the breast roll end portion of a machine embodying our invention.
Figure 5:
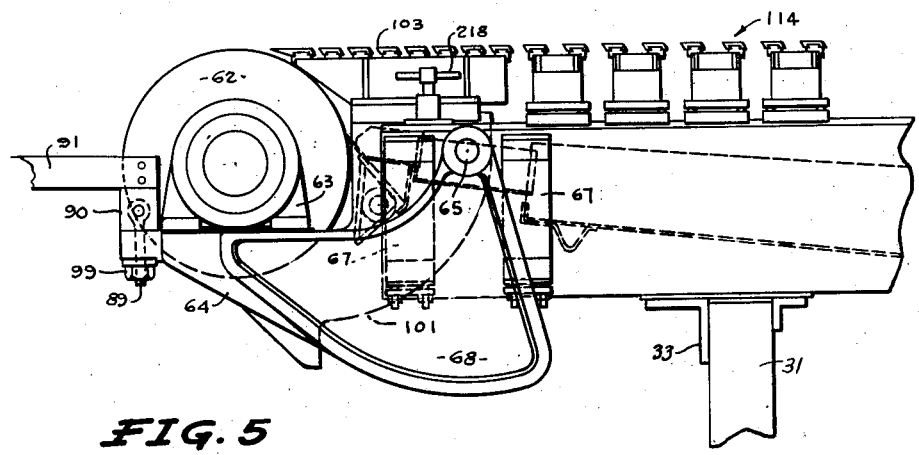
Figure 5 is an enlarged side elevational view of the breast roll support and the contiguous portion of the machine, as shown in the upper left hand portion of Figure 1.

The outer end portions of the arms 64 are formed with spaced projections 88 to receive eye bolts 89 depending from blocks 90. These blocks are supported by horizontally extending flat spring members 91 and vertical spring members 92 extending upwardly from a projection 93 extending laterally from the column 75, see Figures 1 and 8. When fluid pressure is admitted to the lower ends of the cylinders 82 through pipes 95, the piston rods 80 are moved upwardly, effecting rotation of the sheaves 70, 78, in a counterclockwise direction, Figure 1, whereby the cables 69 move the arms 64 about their pivots 65 to swing the breast roll 62 upwardly into operating position, as shown in Figures 1 and 5, and with the breast roll in this position, the eye bolts can be positioned in the slotted extensions 88 of the arms and by means of the nuts 99, the arms become fixedly secured to the blocks 90. In Figure 5, the vertical spring members 92 have been omitted to illustrate more clearly the eye bolt structure.

Figure 6:
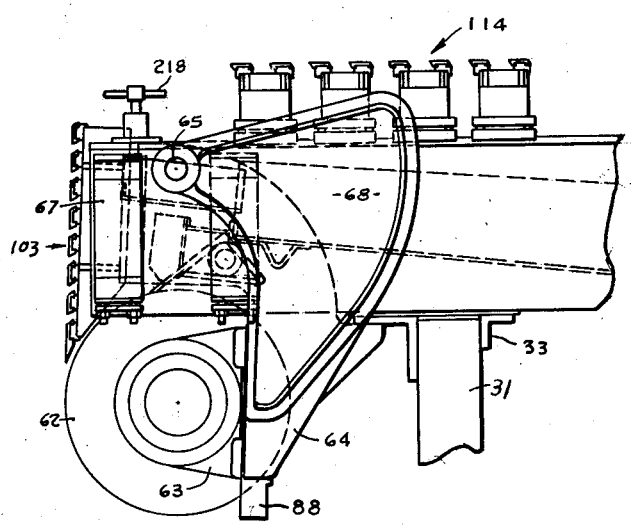
Figure 6 is a view, similar to Figure 5, showing the breast roll and primary forming table swung downwardly to shorten the machine for the insertion of a new wire.

When the nuts 99 are removed from the eye bolts 89, or are loosened, and the eye bolts are swung out of the slotted extensions 88 and fluid pressure is applied to the upper ends of the cylinders 82 through the pipes 100, the mechanism functions to effect lowering of the breast roll to the position shown in Figure 6, as will be apparent.

The breast roll supporting arms 64 are also formed with portions 101 positioned inside of the shake rails 66. These portions are formed with surfaces 102 extending parallel to the shake rails 66 and forwardly from the pivots 65, and on which a primary forming board, designated generally at 103, is mounted. Accordingly, this board moves in unison with the breast roll 62.

Figure 3:
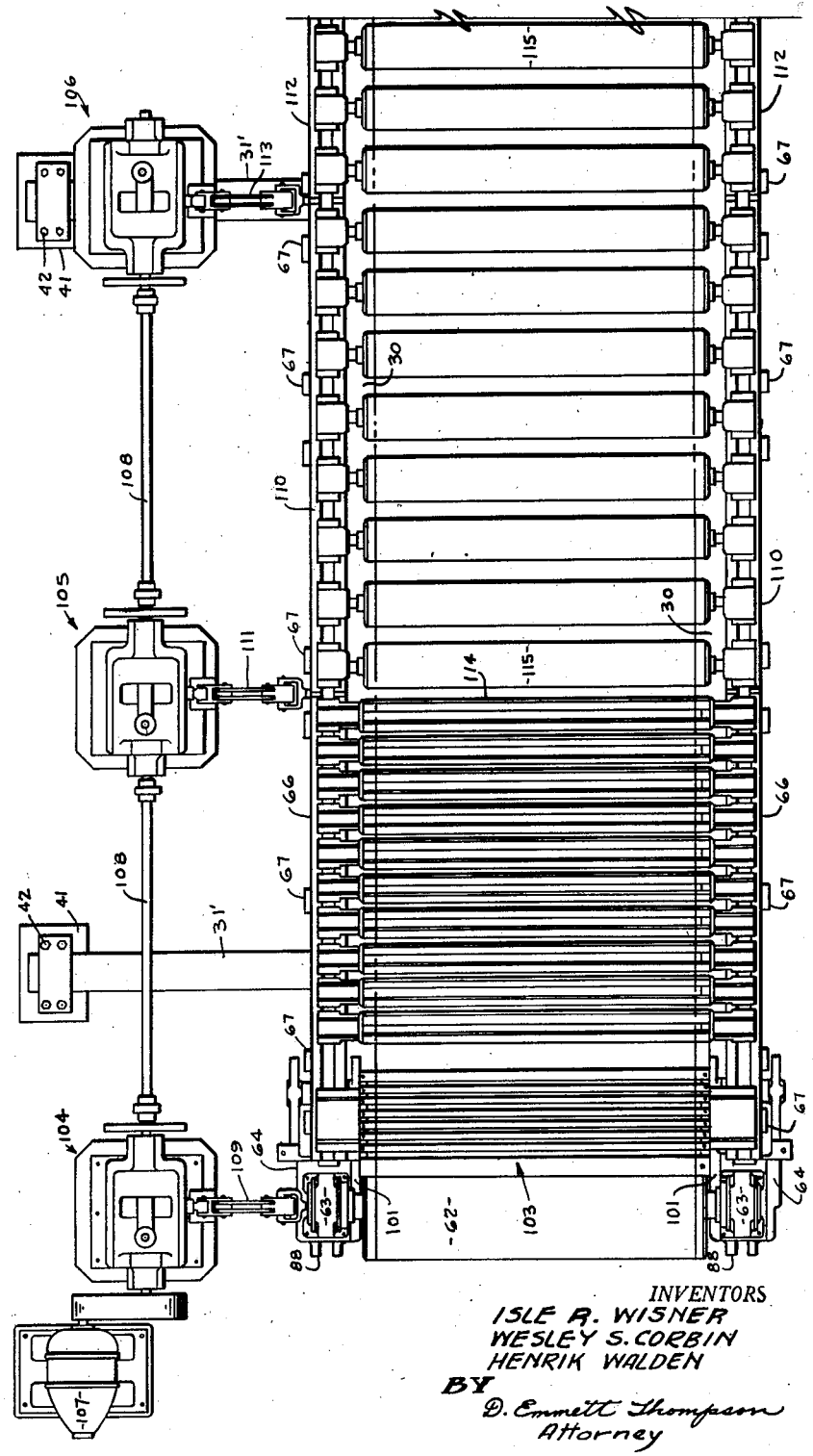
Figure 3 is a top plan view of that portion of the machine shown in Figure 1.

The machine is provided with shake mechanisms designated generally at 104, 105, 106, better shown in Figure 3. These mechanisms are operated by a motor 107 and are connected together by shafts 108, the shake 104 being connected directly to the rear breast roll bearing 63, or to the arm 64 in proximity to the bearing, see Figure 7, by links 109. The shake mechanism 105 is connected at the joint between the rails 66 and the adjacent rails 110 by links 111. The mechanism 106 is connected at the joint between the rails 110, 112, by linkage 113. It will be observed that the breast roll is carried directly by the shake rail 66 and also the blocks 90, for supporting the outer ends of the support members 64, are mounted on the spring members 91, 92, to permit the free shaking movement of the breast roll and the rails 66 when the breast roll is up in operative position shown in Figures 1 and 5.

Figure 2:
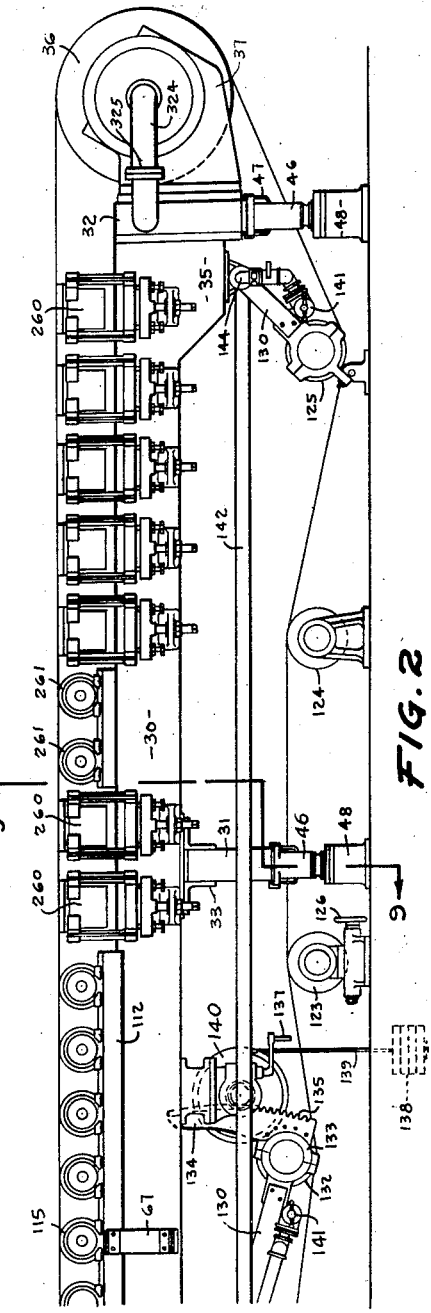
Figure 2 is a side elevational view of the couch roll portion of the machine.

The forward run of the wire 58 is supported by the primary forming board 103, the forming board 114 carried by shake rails 66 and table rolls 115 carried by shake rails 110, 112, see Figures 1 and 2. The return run of the wire 58 is supported by idler rolls 121, 122, 123, 124, see Figures 1 and 2. Some of these rolls may be mounted in fixed bearings, as rolls 122, 124, and some of them may be mounted in adjustable bearings to effect proper tracking of the wire. The roll 123 is mounted in bearings provided with a manual adjustment 126 while the roll 121 is adjusted by mechanism indicated at 127 which functions automatically to adjust the roll to effect proper tracking of the wire on the machine.

The wire is also contacted by take-up rolls 120 and 125. The rolls 120, 125, are journalled at their ends in bearings carried by arms 130, the upper ends of which are pivotally mounted on the framework of the machine and are provided with mechanisms for raising them upwardly toward the frame of the machine, such as the piston and cylinder structures 131, Figures 15 and 16. A take-up roll 132 is provided with mechanism for adjustably positioning the roll to effect proper tension on the wire 58. The bearing housings 133 for the roll 132 carry members 134 formed with an arcuate toothed edge 135 engaging a pinion gear mounted in a housing 136 carried by the side beams and including a worm gear reduction operated by a crank 137. The roll 132 and the supporting arms 130 may be counterbalanced by a weight 138 attached to a cable 139 operating over a sheave 140, see Figure 2.

One or more of the take-up rolls may be provided with a spray or shower pipe 141, these showers being connected to a supply pipe 142 running lengthwise of the machine through rotatable joints 144 to permit the shower pipes 141 to be moved with the arms 130.

When it becomes necessary to change the wire 58, the take-up rolls 120, 125, 132, are moved upwardly and the breast roll 62 swung downwardly into the position shown in Figure 6. This movement of the breast roll shortens the operating center distance between the breast roll and the couch roll sufficiently to provide ample slack in the wire. Thereupon, the jacks 51 are actuated to permit removal of the smaller spacer blocks 49, the jacks lowered, and the spacer blocks 46 are removed providing ample opening on the front side of the machine for the removal of the wire.

Figure 18:
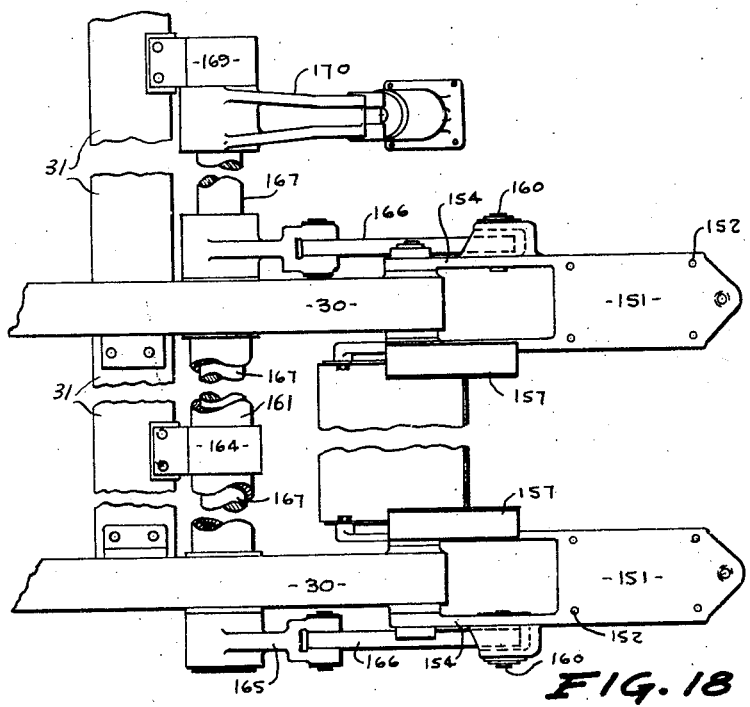
Figure 18 is a top plan view of the structure shown in Figure 17.
Figure 17:
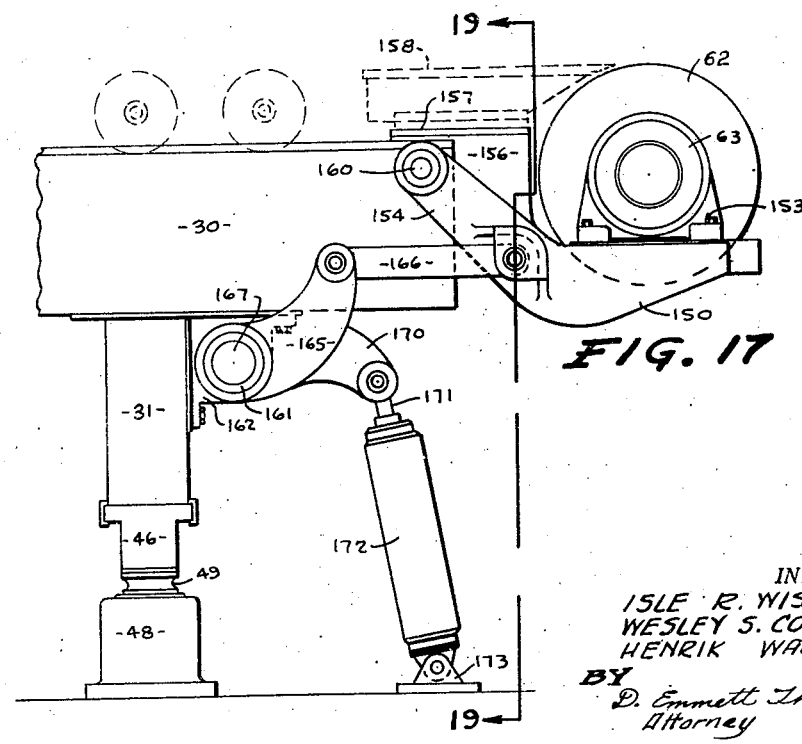
Figure 17 is a side elevational view of a modified breast roll support structure.

A modified form of breast roll supporting structure is shown in Figures 17, 18 and 19. This structure is employed when the Fourdrinier machine is not provided with shake rails. The structure consists of a supporting arm 150 formed with flat surfaces 151 provided with apertures 152 to receive bolts 153 by means of which the breast roll bearings 63 are attached to the arms. The arms 150 are bifurcated to form an outer wall 154 overlying the outer side of the side beam 30 and an inner portion 155 overlying the inner side of the beams 30. These inner portions 155 have a vertically extending portion 156 terminating in a flat shelf portion 157. The primary forming board, designated in dotted outline at 158, Figure 17, is mounted upon these shelf portions 157. The portions 154, 155, are pivotally mounted upon a pin 160 extending through the forward end portion of each of the side beams 30. A tubular shaft 161 is journalled in bearing brackets 162 attached to the under side of the beams 30 and also to the cross beam 31, as by bolts 163. A bearing 164 is attached to the cross beam 31 and is positioned midway between the side beams 30, see Figures 18 and 19. There is an arm 165 fixedly secured to the tubular shaft 161 at the outer side of each of the beams 30 and these arms 165 are connected to the arms 150 by links 166.

A shaft 167 is positioned inside of the tubular shaft 161 and one end of the shaft 167 is fixed to the tubular shaft, as by pins 168, this connection being approximately midway between the bearings 162, see Figure 19. The shaft 167 extends outwardly from the tubular shaft 161 on the rear side of the machine, the free end of the shaft being journalled in a bearing 169 secured to the cross beam 31. The arm is fixedly secured to the shaft 167 in proximity to the bearing 169. The arm 170 is pivotally connected to the upper end of a piston rod 171 extending from a cylinder 172, the lower end of which is pivotally mounted to a bracket 173 fixed to the floor structure.

With this arrangement, when fluid under pressure is admitted in the upper end of the cylinder 172, the piston rod 171 is moved downward and the arms 150 are swung upwardly into the position shown in Figure 17, as will be apparent. The admission of fluid under pressure to the lower end of the cylinder 172 effects counterclockwise rotation of the shafts 161, 167, Figures 17, 18 and 19, effecting downward movement of the breast roll.

The purpose of the quill shaft arrangement is to apply torque to the tubular shaft 161 midway between the arms 165 so that any twist of the shaft will be distributed more or less equally and maintain the arms 150 in parallel relationship.

Figure 7:
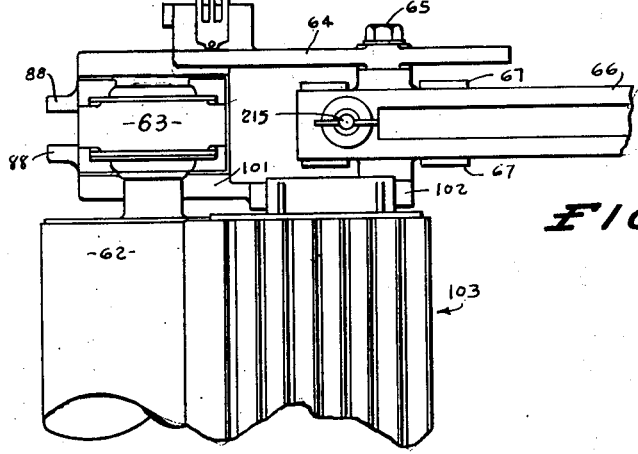
Figure 7 is a top plan view of the rear end of the breast roll and primary forming table and the supporting mechanism therefor.
Figure 8:
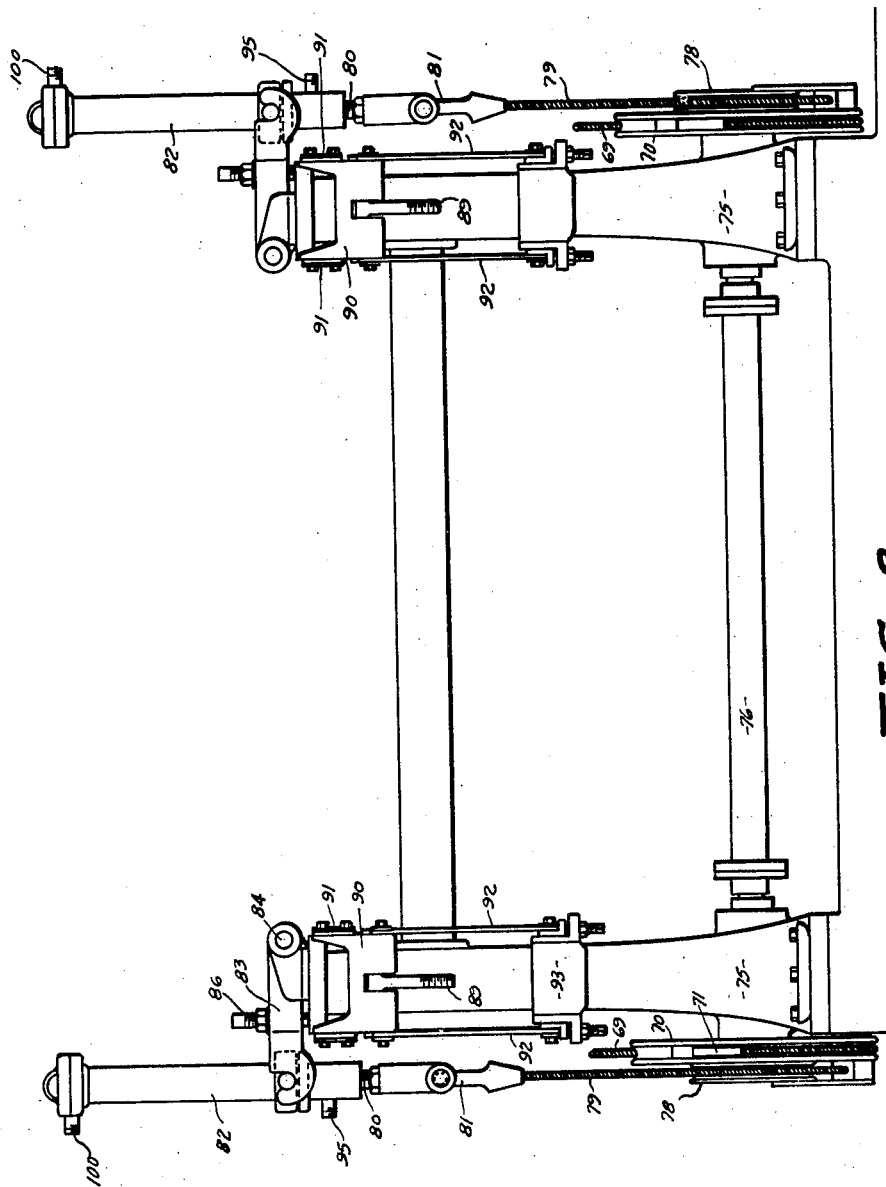
Figure 8 is an elevational view of the breast roll support moving mechanism, the view being taken on a line corresponding to line 8—8, Figure 1.
Figure 14:
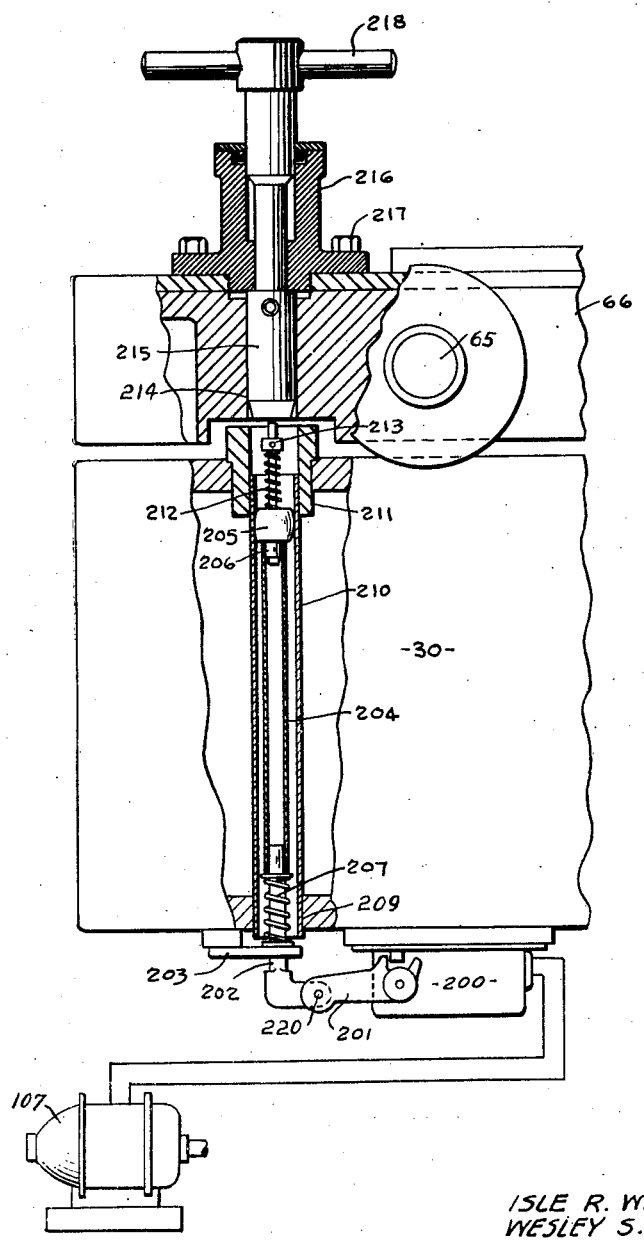
Figure 14 is an enlarged vertical sectional view of the safety interlock mechanism between the shake rails and side beams of the machine.

In connection with the Fourdrinier shown in Figures 1 and 7, which is provided with shake rails to support the forming boards and table rolls, interlock mechanism is provided to prevent operation of the shake mechanisms 104, 105, 106, while the breast roll supporting arms 64 and the breast roll 62 carried thereby are disconnected from the supporting columns 75. Referring to Figure 14, the electrical circuit to the motor 107 is controlled through a switch 200 mounted on the front side beam 30. This switch is provided with an actuating member 201 pivotally connected to the lower end of a stem 202 arranged for vertical sliding movement in a bracket 203. The upper end of the stem is fixedly secured to the lower end of a tube 204, on the upper end of which is positioned a collar 205 apertured to slidably receive a stem 206. A helical compression spring 207 encircles the stem 202 and is interposed between the bracket 203 and the lower end of the tube 204, this assembly being enclosed in an outer tube 210, the lower end of which is positioned in an aperture 209 in the bottom wall of the side beam 30, and the upper end is positioned in a bushing 211 mounted in the top wall of the side rail, see Figure 14. A helical compression spring 212 encircles the upper end of the stem 206, the spring being interposed between the collar 205 and a collar 213 fixedly secured to the stem.

The shake rail 66 is provided with a vertical aperture 214 in which there is slidably mounted a plug 215. This plug is arranged in registration with the tube 210, and the upper portion of the plug is guided by a collar 216 secured to the top surface of the rail 66, as by screws 217. The upper end of the plug is provided with a laterally extending handle 218. As shown in Figures 5–7, this interlock assembly is duplicated on both the front and back sides of the machine.

When the machine is in operation, the switch 200 provides an operating circuit for the motor 107 and interrupts a circuit to the motor operated pump, not shown, which furnishes fluid pressure to the machine including the cylinders 82. When the plug 215 is moved downwardly, it engages the pin 206, compressing the spring 212 and effecting downward movement of the tube 204 and stem 202 against the action of spring 207, effecting movement of the actuating member 201 about its pivot 220 which effects a shifting of the switch contacts to open the control circuit to the motor 107, and to energize the circuit to the hydraulic pump mechanism. This downward movement positions the lower end of the plug 215 into the bushing 211. Thus, the shake rail 66 becomes fixedly secured to the side beam 30. Upon downward movement of the plug 215, as explained, fluid under pressure is made available to operate the cylinder structures 82 to permit lowering of the breast roll and, with the breast roll in lowered position, the actuating motor 107 for the shake mechanisms can not be operated. In other words, the interlock mechanism just described functions to prevent accidental operation of the shake mechanisms with the breast roll in lowered position, as shown in Figure 6.

The machine illustrated in Figures 15 and 16 is provided with mechanical screw jacks 230 for supporting the spacer blocks 46. The jacks 230 are connected together and to a motor operated gear box 233 by means including shaft 231 such that all of the jacks are operated in unison. The mechanical screw jacks 230 are employed when it is desired to tilt or incline the Fourdrinier. The screw jacks 230 can be initially adjusted relative to each other to give an inclination or pitch to the side beams 30, and this relation of the jacks will be maintained during their up and down movement, as will be apparent. In this connection, the supporting columns 40, arranged under the rear side beam 30, are adjusted or provided with spacer pads to effect the desired pitch of the machine, and the rear ends of the beams 31, 32, are likewise adjusted by the bolts 42 and adjusting screws 235, see Figure 9, or the columns 40 may be provided with other means for adjustably positioning the beams 31, 32, and conventional lock stands 236 provided for the rear side beam 30.

In the arrangement of the hydraulic operated jacks shown in Figures 1 and 2, or the mechanical screw jacks shown in Figures 15, 16, the cross beams 31, 32, are, upon installation, initially pre-stressed by the adjustment of the bolts 42 and screws 235 so that upon removal of the jacks from in under the front side beam 30, there is substantially no deflection of the beams 31, 32.

It will be understood that a head box is arranged in juxtaposition to the breast roll 62 and is provided with a discharge opening extending transversely of the wire through which the pulp solution is discharged onto the wire. As the wire moves forwardly, the water drains through the primary forming board 103, the forming board 114, and through the wire supported by the table rolls 115, leaving a commingled layer of fiber on the wire forming the paper sheet. Further moisture is removed from this sheet by suction boxes over which the wire passes.

As shown in Figure 2, a pair of suction boxes 260 are arranged at the end of the shake rails 112, and a series of suction boxes are mounted on the couch roll end of the machine. These suction boxes may be arranged in various groups and are sometimes separated by table rolls 261 journalled in bearings mounted directly on the side beams 30. The suction boxes 260 are formed of metal and have a flat top surface engaged by the wire and provided with openings, usually in the form of slits extending lengthwise of the boxes and transversely of the wire. The interior of the boxes is connected to a suction pump (not shown). Referring to Figures 10–12, a bracket 262 is secured to each end of the suction boxes, the brackets being formed with spaced apart bosses 263 apertured to receive pins 264. The boxes are supported by a pair of vertically extending links 265. The lower ends of the links 265 are pivotally mounted on cylindrical end portions 266 of a member 267. The upper ends of the links 265 are apertured to receive the pins 264, the pins being clamped thereto by detachable cap members 268. The member 267 is mounted for rocking movement intermediate its ends on a supporting pin 270 which is fixedly carried by a plate 271 having depending spaced apart projections 272 formed with elongated apertures 274 to receive clamping screws 275.

The plate 271 is slidably mounted in ways or gibs 277 fixedly secured to the outer surface of the side beams 30, as by screws 278, see Figures 10, 11 and 12. The plate 271 is formed with an outwardly extending rib 280, the under side of which has a recessed boss 281 engaged by the upper end of an adjustment screw 282. This screw is threaded for vertical movement into a casting 283 also fixedly secured to the side beam 30, as by screws 284.

The member 280 is also provided with a pair of leveling screws 286, the upper ends of which engage the under side of the member 267. When the screws 275 are loosened, the plate 271 and the member 267 carried thereby may be adjusted vertically by the screw 282 and inasmuch as the suction box is supported by this structure at both ends, the box can be leveled in a direction transversely of the wire and by manipulation of the screws 286 the box can be moved about the axis of the pin 270 to level the top surface of the box in a direction lengthwise of the wire.

Figure 4:
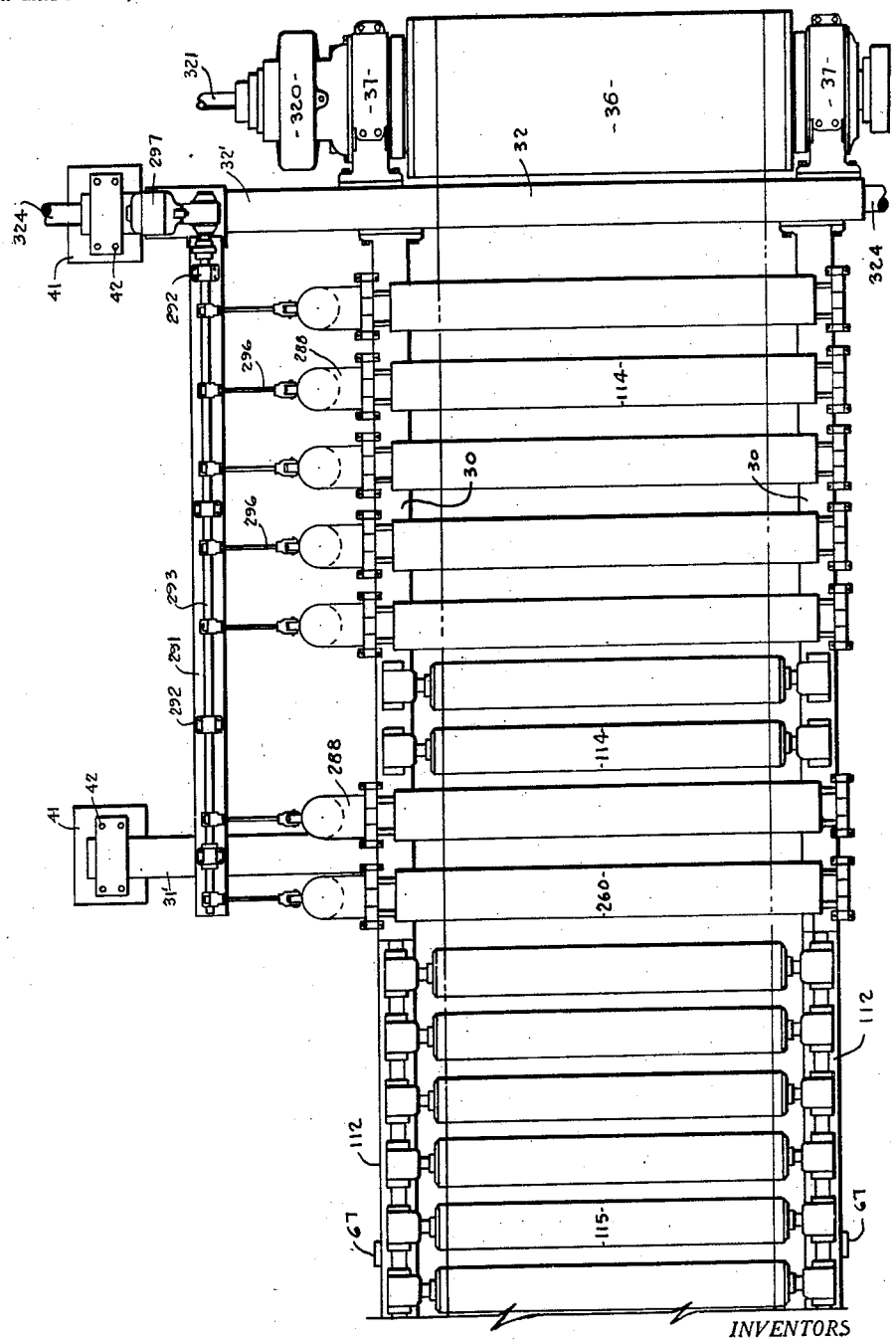
Figure 4 is a top plan view of that portion of the machine shown in Figure 2.

Each of the suction boxes 260 is formed with a rearwardly extending hollow structure 288 attached to a flexible conduit 290 which extends downwardly and is connected to the suction pump. A shaking movement is usually imparted to the suction boxes 260 and, as shown in Figures 4 and 9, a supporting beam 291 is mounted on the cross beam 32 and the next adjacent cross beam 31. A series of bearings 292 are mounted on the beam 291 and a shaft 293 is journalled in the bearings and is provided in registration with each box with an eccentric 294, encircled by an eccentric strap 295 connected to the suction outlet member 288 of each box, by a link 296. Rotation is imparted to the shaft 293 by a motor 297 mounted on the rear end of the cross beam 32.

The rapid movement of the wire 58 over the top surface of the suction boxes effects considerable wear on these surfaces which require the boxes to be removed and resurfaced periodically. The removal of the boxes is conveniently accomplished by means of a carriage 298 (Figures 9 and 20) provided at its ends with rollers 299 which ride on a track 300 fixedly mounted on the inner surface of each of the side beams 30, by a series of brackets 301.

Figure 20:
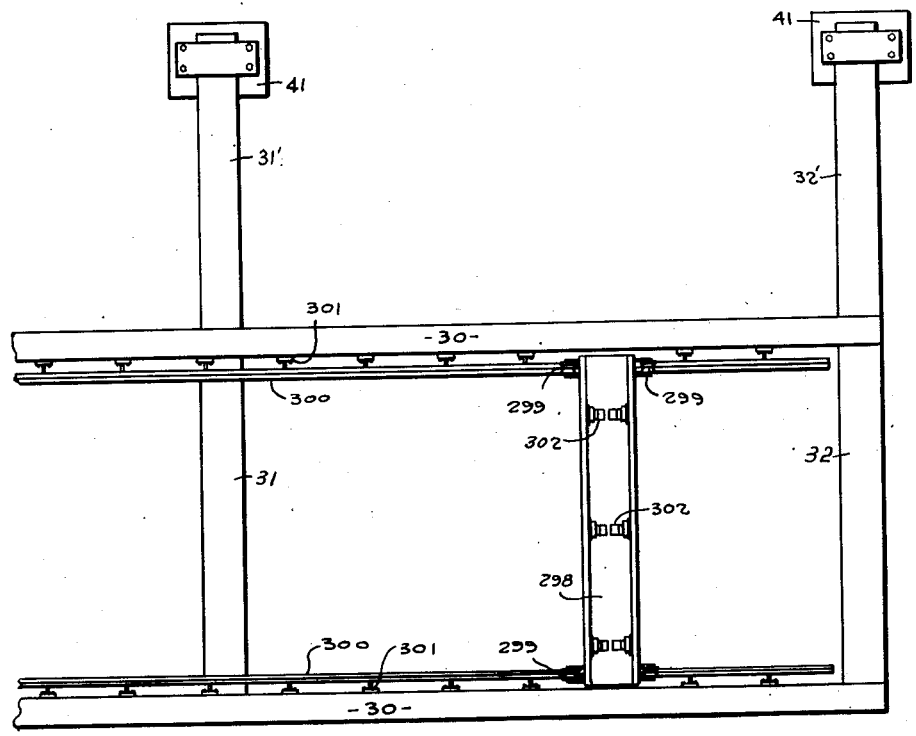
Figure 20 is a top plan view of the suction box, removal carriage and the supporting track on which the carriage operates.

Referring to Figures 9 and 20, the carriage 298 is provided with a plurality of rollers 302. When it is desired to remove a suction box 260, the carriage 298 is moved along the tracks 300 to position the carriage under the suction box, which is to be removed. The shake link 296 is disconnected from the box, as well as the flexible conduit 290. This permits the box to be removed laterally on the supporting links 265, the links acting as a parallelogram movement to lower the box onto the rollers 302. The caps 268 are then loosened and the pins 264 removed, whereupon the box can be withdrawn laterally from the front side of the machine and during this movement it is supported on the rollers 302.

The couch roll 36 usually has a perforated shell and there is a suction box located within the roll to remove further moisture from the sheet. The rear end of the couch roll is provided with a housing 320 which is connected to a suction pipe extending downwardly through the floor structure. This housing 320 has extending rearwardly from it a shaft 321 which is connected to a suitable source of power, such as an electric motor, to effect rotation of the couch roll.

There are occasions when it is desired to have two separate suction boxes mounted in the couch roll, these boxes being connected to separate sources of suction or vacuum of different values. When this arrangement is employed, it is necessary to provide a suction outlet, as 322, at the forward end of the couch roll, or at the front side of the machine. Heretofore, these housings 322 have been also connected with a vertically arranged suction pipe and it was necessary to disconnect and remove this pipe in order to remove and replace the wire 58.

In our machine, we make provision for the second suction box in the couch roll and connect it with a source of vacuum in such a manner as it is not necessary to remove any connections to the couch roll for the removal of the wire. As previously stated, the cross beams are of hollow box formation and the cross beam 32 is provided with a suction pipe 324 extending therethrough and projecting from the rear end thereof, as illustrated in Figure 21. This suction pipe 324 is connected to the housing 322 on the forward end of the couch roll as by a flanged coupling 325. With this arrangement, the suction pipe 324, exposed on the forward side of the machine, is well within the diameter of the couch roll, see Figure 2, and accordingly, in no way interferes with the removal and insertion of the wire 58.

From the structure described, it will be apparent that the wire 58 can be removed and replaced quickly and conveniently. In carrying out this operation, it is not necessary to change the position of the machine frame by cantilevering it on a horizontal axis, moving it in a lengthwise direction, or in a transverse direction. Because the machine is not moved, it is not necessary to disconnect the shake mechanisms, the conduits to the suction boxes and suction couch roll, or other appurtenances.

The spacer blocks and/or jacks serve to relieve the cross beams from unnecessary stresses and strains during the actual operation of the machine. However, the cross beams are entirely sufficient to support the machine when it is not in actual operation.

Reference is made to our copending applications Serial Nos. 506,152 and 506,153, both filed May 2, 1955, as divisions of the present application and assigned to the same assignee as this application.

What we claim is:

1. A Fourdrinier paper making machine comprising a frame including front and rear side beams extending lengthwise of the frame, a plurality of cross beams supporting said side beams and extending rearwardly from said rear side beam, the rearwardly extending portion of each of said cross beams being fixedly mounted on supporting structures, a couch roll mounted on one end of the frame and supported entirely thereby, a breast roll mounted on the opposite end of the frame for movement relatively thereto toward and from the couch roll, a housing arranged under the front end of each of said cross beams, a spacer block interposed between said housing and the cross beam, a power operated jack arranged in each of said housings, said jacks being operable to relieve the beam load on said spacer blocks for their removal from under the cross beams.

2. In a Fourdrinier paper machine including a breast roll and a couch roll at opposite ends thereof, a pair of front and rear side beams extending substantially the full length of said machine from said breast roll to said couch roll, a plurality of cross beams located in spaced relation along said machine and connecting said side beams to form a unitary frame, means mounting said couch roll directly on said frame, means mounting said breast roll for movement on said frame towards said couch roll for removal and replacement of the forming wire thereon, each of said cross beams including an elongated extension projecting rearwardly of said frame beyond said rear side beam, a plurality of base supports for said frame each fixedly secured to one of said cross beams closely adjacent said rear side beams, additional base supports each located adjacent the rearward end of one of said cross beam extensions, and means fixedly securing said ends of said cross beam extensions to said additional base supports with each said cross beam permanently cantilevered to support said front side beam in substantially the same horizontal plane with said rear side beam in the absence of other support for said front side beam for free removal and replacement of the forming wire over said frame from the front side thereof.

3. In a Fourdrinier paper machine including a breast roll and a couch roll at opposite ends thereof, a pair of front and rear side beams extending substantially the full length of said machine from said breast roll to said couch roll, a plurality of cross beams located in spaced relation along said machine and connecting said side beams to form a unitary frame, means mounting said couch roll directly on said frame, means mounting said breast roll for movement on said frame towards said couch roll for removal and replacement of the forming wire thereon, each of said cross beams including an elongated extension projecting rearwardly of said frame beyond said rear side beam, a plurality of base supports for said frame each fixedly secured to one of said cross beams closely adjacent said rear side beam, additional base supports each located adjacent the rearward end of one of said cross beam extensions, means fixedly securing said ends of said cross beam extensions to said additional base supports with each said cross beam permanently cantilevered to support said front side beam in substantially the same horizontal plane with said rear side beam in the absence of other support for said front side beam, removable support means located below said front side beam to relieve the load on said cross beams during operation of said machine, and jack means located to apply a temporary direct lifting force to said front side beam to release said removable support means and then to leave said frame supported entirely by said base supports for free removal and replacement of the forming wire over said frame from the front side thereof.

4. In a Fourdrinier paper machine including a breast roll and a couch roll at opposite ends thereof, a pair of front and rear side beams extending substantially the full length of said machine from said breast roll to said couch roll, a plurality of cross beams located in spaced relation along said machine and connecting said side beams to form a unitary frame, means mounting said couch roll directly on said frame, a pair of shake rails mounted on said side beams for shaking movement with respect thereto, means mounting said breast roll on said shake rails and including means for moving said breast roll towards said couch roll for removal and replacement of the forming wire thereon, each of said cross beams including an elongated extension projecting rearwardly of said frame beyond said rear side beam, a plurality of base supports for said frame each fixedly secured to one of said cross beams closely adjacent said rear side beam, additional base supports each located adjacent the rearward end of one of said cross beam extensions, and means fixedly securing said ends of said cross beam extensions, and means fixedly securing said ends of said cross beam extensions to said additional base supports with each said cross beam permanently cantilevered to support said front side beam in substantially the same horizontal plane with said rear side beam in the absence of other support for said front side beam for free removal and replacement of the forming wire over said frame from the front side thereof.

5. In a Fourdrinier paper machine including a breast roll and a couch roll at opposite ends thereof, a pair of front and rear side beams extending substantially the full length of said machine from said breast roll to said couch roll, a plurality of cross beams located in spaced relation along said machine and connecting said side beams to form a unitary frame, means mounting said couch roll directly on said frame, a pair of supporting arms for said breast roll, bearings for said breast roll mounted on said arms, means pivotally mounting said arms on said frame for swinging movement of said breast roll and said bearings therefor towards said couch roll for removal and replacement of the forming wire thereon, each of said cross beams including an elongated extension projecting rearwardly of said frame beyond said rear side beam, a plurality of base supports for said frame each fixedly secured to one of said cross beams closely adjacent said rear side beam, additional base supports each located adjacent the rearward end of one of said cross beam extensions, and means fixedly securing said ends of said cross beam extensions to said additional base supports with each said cross beam permanently cantilevered to support said front side beam in substantially the same horizontal plane with said rear side beam in the absence of other support for said front side beam for free removal and replacement of the forming wire over said frame from the front side thereof.

6. In a Fourdrinier paper machine including a breast roll and a couch roll at opposite ends thereof, a pair of front and rear side beams extending substantially the full length of said machine from said breast roll to said couch roll, a plurality of cross beams located in spaced relation along said machine and connecting said side beams to form a unitary frame, means mounting said couch roll directly on said frame, side beams for shaking movement with respect thereto, a pair of supporting arms for said breast roll, bearings for said breast roll mounted on said arms, means pivotally mounting said arms on said shake rails for swinging movement of said breast roll and said bearings therefor towards said couch roll for removal and replacement of the forming wire thereon, each of said cross beams including an elongated extension projecting rearwardly of said frame beyond said rear side beam, a plurality of base supports for said frame each fixedly secured to one of said cross beams closely adjacent said rear side beam, additional base supports each located adjacent the rearward end of one of said cross beam extensions, and means fixedly securing said ends of said cross beam extensions to said additional base supports with each said cross beam permanently cantilevered to support said front side beam in substantially the same horizontal plane with said rear side beam in the absence of other support for said front side beam for free removal and replacement of the forming wire over said frame from the front side thereof.

7. In a Fourdrinier paper machine including a breast roll and a couch roll at opposite ends thereof, a pair of front and rear side beams extending substantially the full length of said machine from said breast roll to said couch roll, a plurality of cross beams located in spaced relation along said machine and connecting said side beams to form a unitary frame, means mounting said couch roll directly on said frame, a pair of supporting arms for said breast roll, bearings for said breast roll mounted on said arms, primary forming board means mounted on said arms forwardly of said bearings, means pivotally mounting said arms on said frame for swinging movement of said breast roll with said bearings therefor and said forming board means towards said couch roll for removal and replacement of the forming wire thereon, each of said cross beams including an elongated extension projecting rearwardly of said frame beyond said rear side beam, a plurality of base supports for said frame each fixedly secured to one of said cross beams closely adjacent said rear side beam, additional base supports each located adjacent the rearward end of one of said cross beam extensions, and means fixedly securing said ends of said cross beam extensions to said additional base supports with each said cross beam permanently cantilevered to support said front side beam in substantially the same horizontal plane with said rear side beam in the absence of other support for said front side beam for free removal and replacement of the forming wire over said frame from the front side thereof.

References Cited in the file of this patent

UNITED STATES PATENTS

| | | |
|---|---|---|
| 1,586,204 | Lamoureux | May 25, 1926 |
| 1,713,988 | Valentine et al. | May 21, 1929 |
| 1,738,520 | Beadle | Dec. 10, 1929 |
| 1,790,082 | Aldrich | Jan. 27, 1931 |
| 1,851,941 | Broadhurst | Mar. 29, 1932 |
| 1,860,303 | White | May 24, 1932 |
| 1,880,685 | Berry | Oct. 4, 1932 |
| 1,917,288 | Aldrich et al. | July 11, 1933 |
| 1,998,095 | Reynolds | Apr. 16, 1935 |
| 2,003,103 | Berry | May 28, 1935 |
| 2,039,780 | Darby | May 5, 1936 |
| 2,047,422 | Malkin | July 14, 1936 |
| 2,055,692 | Lang | Sept. 29, 1936 |
| 2,145,226 | Malkin | Jan. 24, 1939 |
| 2,360,773 | Helin | Oct. 17, 1944 |
| 2,634,658 | Fasoli | Apr. 14, 1953 |